US009042278B2

(12) United States Patent
Sun et al.

(10) Patent No.: US 9,042,278 B2
(45) Date of Patent: May 26, 2015

(54) METHOD AND APPARATUS FOR DETECTING SYNCHRONIZATION POSITION OF LTE CELL

(71) Applicant: Huawei Technologies Co., Ltd., Shenzhen (CN)

(72) Inventors: Xingguo Sun, Shenzhen (CN); Haijun Wang, Beijing (CN); Jiqian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 13/761,891

(22) Filed: Feb. 7, 2013

(65) Prior Publication Data

US 2014/0071861 A1 Mar. 13, 2014

(30) Foreign Application Priority Data

May 21, 2012 (CN) .......................... 2012 1 0157787

(51) Int. Cl.
| | |
|---|---|
| *H04W 52/02* | (2009.01) |
| *H04J 11/00* | (2006.01) |
| *H04W 56/00* | (2009.01) |
| *H04L 27/26* | (2006.01) |
| *H04L 5/14* | (2006.01) |

(52) U.S. Cl.
CPC ....... *H04W 52/0209* (2013.01); *H04J 11/0073* (2013.01); *H04J 11/0093* (2013.01); *H04L 5/1469* (2013.01); *H04W 56/00* (2013.01); *H04L 27/2662* (2013.01)

(58) Field of Classification Search
CPC . H04W 52/0209; H04W 56/00; H04L 5/0053
USPC .......................... 370/280, 336, 329, 252, 350
See application file for complete search history.

(56) References Cited

U.S. PATENT DOCUMENTS

| | | | |
|---|---|---|---|
| 2007/0140106 A1 | 6/2007 | Tsai et al. | |
| 2009/0196279 A1* | 8/2009 | Kim et al. | 370/350 |
| 2009/0304136 A1* | 12/2009 | Kondo | 375/359 |

FOREIGN PATENT DOCUMENTS

| | | |
|---|---|---|
| EP | 1983775 A1 | 10/2008 |
| EP | 2051395 A1 | 4/2009 |
| JP | H06077948 | 3/1994 |

OTHER PUBLICATIONS

Extended European Search Report issued in corresponding European Patent Application No. 13155620.1, mailed Jun. 4, 2013, 6 pages.

* cited by examiner

*Primary Examiner* — Jamal Javaid
(74) *Attorney, Agent, or Firm* — Brinks Gilson & Lione (57) ABSTRACT

The present invention provides a method and an apparatus for detecting a synchronization position of an LTE cell. A part of sampling points are selected from all sampling points of received data, where the received data is generated by filtering a local sequence from a base station; correlation operations are carried out on the part of the sampling points, and multiple first correlation results and multiple pieces of first position information that correspond to the part of the sampling points are obtained; and a maximum first correlation result is determined among at least one first correlation result greater than a preset threshold in the multiple first correlation results, and a piece of first position information, which corresponds to the maximum first correlation result, is taken as a synchronization position.

15 Claims, 7 Drawing Sheets

METHOD AND APPARATUS FOR DETECTING SYNCHRONIZATION POSITION OF LTE CELL

CROSS-REFERENCE TO RELATED APPLICATIONS

This application claims priority to Chinese Patent Application No. 201210157787.3, filed on May 21, 2012, which is hereby incorporated by reference in its entirety.

FIELD OF THE INVENTION

The present invention relates to the communications technologies, and in particular to a method and an apparatus for detecting a synchronization position of an LTE cell.

BACKGROUND OF THE INVENTION

A cell search is an important step in a baseband processing process in a long term evolution (Long Term Evolution, LTE for short) technology. In the baseband processing process, cell information is acquired through the cell search. During the cell search, a synchronization position of a cell needs to be detected. For example, primary synchronization detection, a secondary synchronization detection, and the like of the cell are performed.

Take the primary synchronization detection for example. In an LTE system, a base station sends one local sequence at an interval of 5 ms; and a user equipment receives, by using an antenna, the local sequence sent by the base station, filters the local sequence by using a low-pass filter, obtains received data, and inputs the received data into a primary synchronization detection apparatus. The size of the received data is 1.4 M, and the received data contains 9600 sampling points. According to an existing primary synchronization detection method, the primary synchronization detection apparatus obtains the received data and carries out three correlation operations, that is, NID2=0, NID2=1, and NID2=2, on each of all the 9600 sampling points in the received data. NID2 is a type 2 network identity (Network Identity, NID2 for short). Correlation results and position information corresponding to the correlation results are obtained through the foregoing correlation operations. Then, the correlation results are compared with a threshold; sequencing is performed on correlation results greater than the threshold; and finally, a primary synchronization position is determined according to the sequencing, and a number of the primary synchronization position in a group is taken as an NID2 value.

According to an existing primary synchronization detection method and apparatus, three correlation operations are carried out on each of all the 9600 sampling points in the received data, totally 28800 correlation operations need to be carried out, and therefore a large number of calculation resources are required. The primary synchronization detection apparatus needs to use a large number of circuits to complete the foregoing correlation operations. As a result, a cost for implementing the primary synchronization detection apparatus is high, and operating power consumption is high. The same defects also exist in an existing secondary synchronization detection method and apparatus. In conclusion, the cost for implementing the existing method and apparatus for detecting a synchronization position of an LTE cell is high, and the operating power consumption is high.

SUMMARY OF THE INVENTION

In a first aspect, an embodiment of the present invention provides a method for detecting a synchronization position of an LTE cell, for rectifying a defect in the prior art, and reducing a cost and power consumption for detecting the synchronization position of the LTE cell.

In another aspect, an embodiment of the present invention provides an apparatus for detecting a synchronization position of an LTE cell, for rectifying a defect in the prior art, and reducing a cost and power consumption for detecting the synchronization position of the LTE cell.

In the first aspect, an embodiment of the present invention provides a method for detecting a synchronization position of a long term evolution LTE cell, including:

selecting a part of sampling points from all sampling points of received data, where the received data is generated by filtering a local sequence from a base station;

carrying out correlation operations on the part of the sampling points, and obtaining multiple first correlation results and multiple pieces of first position information that correspond to the part of the sampling points; and determining a maximum first correlation result among at least one first correlation result greater than a preset threshold in the multiple first correlation results, and taking a piece of first position information, which corresponds to the maximum first correlation result, as a synchronization position.

In another aspect, an embodiment of the present invention provides an apparatus for detecting a synchronization position of a long term evolution LTE cell, including:

a work window control unit, configured to select a part of sampling points from all sampling points of received data, where the received data is generated by filtering a local sequence from a base station;

a correlation operation unit, configured to carry out correlation operations on the part of the sampling points, and obtain multiple first correlation results and multiple pieces of first position information that correspond to the part of the sampling points; and a comparison and sequencing unit, configured to determine a maximum first correlation result among at least one first correlation result greater than a preset threshold in the multiple first correlation results and take a piece of first position information, which corresponds to the maximum first correlation result, as a synchronization position.

As can be seen from the foregoing embodiments, a part of sampling points are selected from all sampling points of received data, correlation operations are carried out only on the part of the sampling points, and executions such as comparison and sequencing are performed on correlation operation results of the part of the sampling points, so that a large number of correlation operations are saved, and meanwhile, the operations such as comparison and sequencing are saved. By saving the operation amount, power consumption for detecting a synchronization position of an LTE cell is reduced, an operation processing capability required by a hardware device is reduced, so that a cost for detecting the synchronization position of the LTE cell is reduced.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following descriptions show merely some embodiments of the present invention, and persons of ordinary skill in the art may still derive other drawings from these accompanying drawings without creative efforts.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
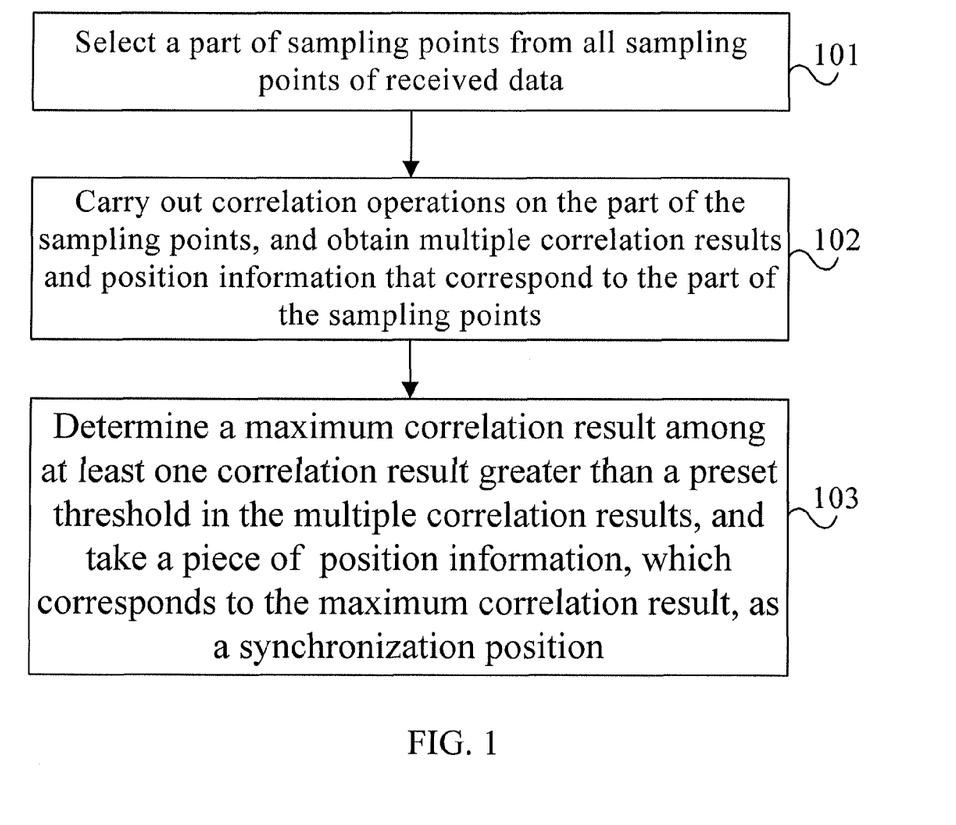
FIG. 1 is a flowchart of a method for detecting a synchronization position of an LTE cell according to a first embodiment of the present invention.

FIG. 1 is a flowchart of a method for detecting a synchronization position of an LTE cell according to a first embodiment of the present invention. As shown in FIG. 1, the method includes the following process.

Step 101: Select a part of sampling points from all sampling points of received data.

Specifically, in this step, the received data is generated by filtering a local sequence from a base station.

Step 102: Carry out correlation operations on the part of the sampling points, and obtain multiple correlation results and position information that correspond to the part of the sampling points.

Step 103: Determine a maximum correlation result among at least one correlation result greater than a preset threshold in the multiple correlation results, and take a piece of position information, which corresponds to the maximum correlation result, as a synchronization position.

In the first embodiment of the present invention, a part of sampling points are selected from all sampling points of received data, correlation operations are carried out only on the part of the sampling points, and executions such as comparison and sequencing are performed on correlation operation results of the part of the sampling points to acquire a synchronization position. The part of the sampling points are selected from all the sampling points, so that a large number of correlation operations are saved, and meanwhile, the operations such as comparison and sequencing are saved. By saving the operation amount, power consumption for detecting a synchronization position of an LTE cell is reduced. In addition, by saving the operations, an operation processing capability of a hardware device is lowered, and a cost for detecting the synchronization position of the LTE cell is reduced.

Figure 2A:
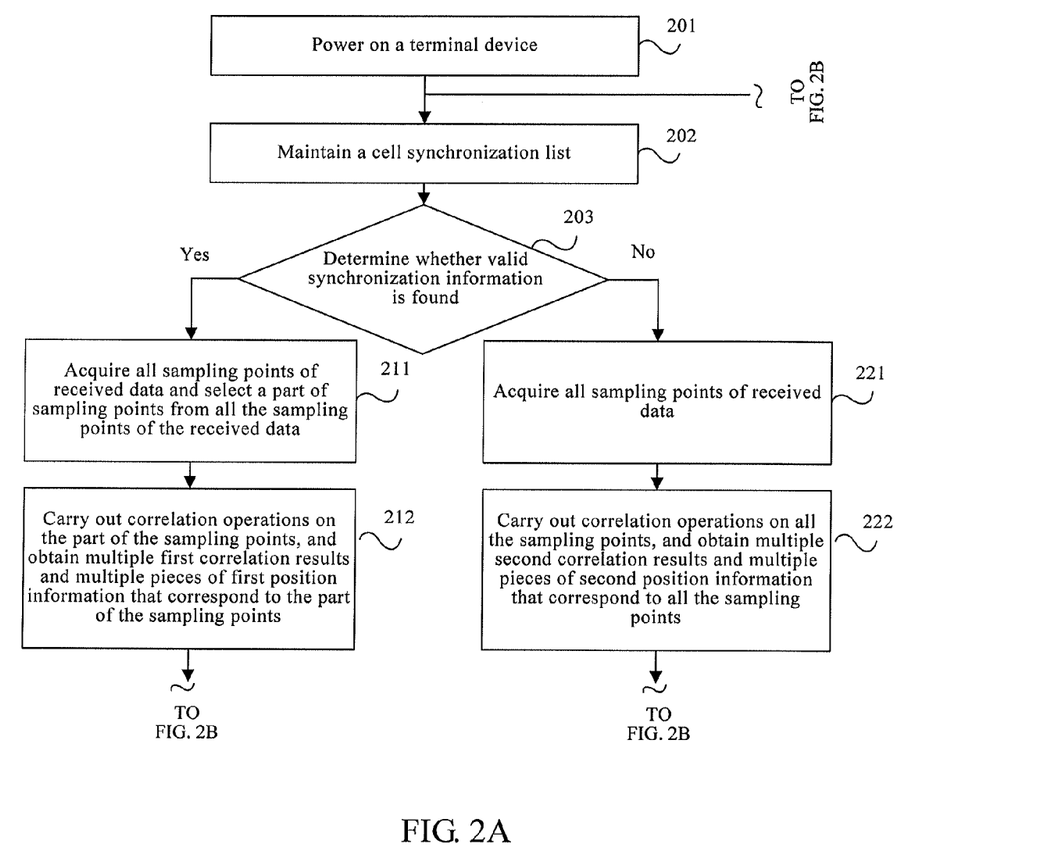
FIGS. 2A and 2B describe a flowchart of a method for detecting a synchronization position of an LTE cell according to a second embodiment of the present invention.
Figure 2B:
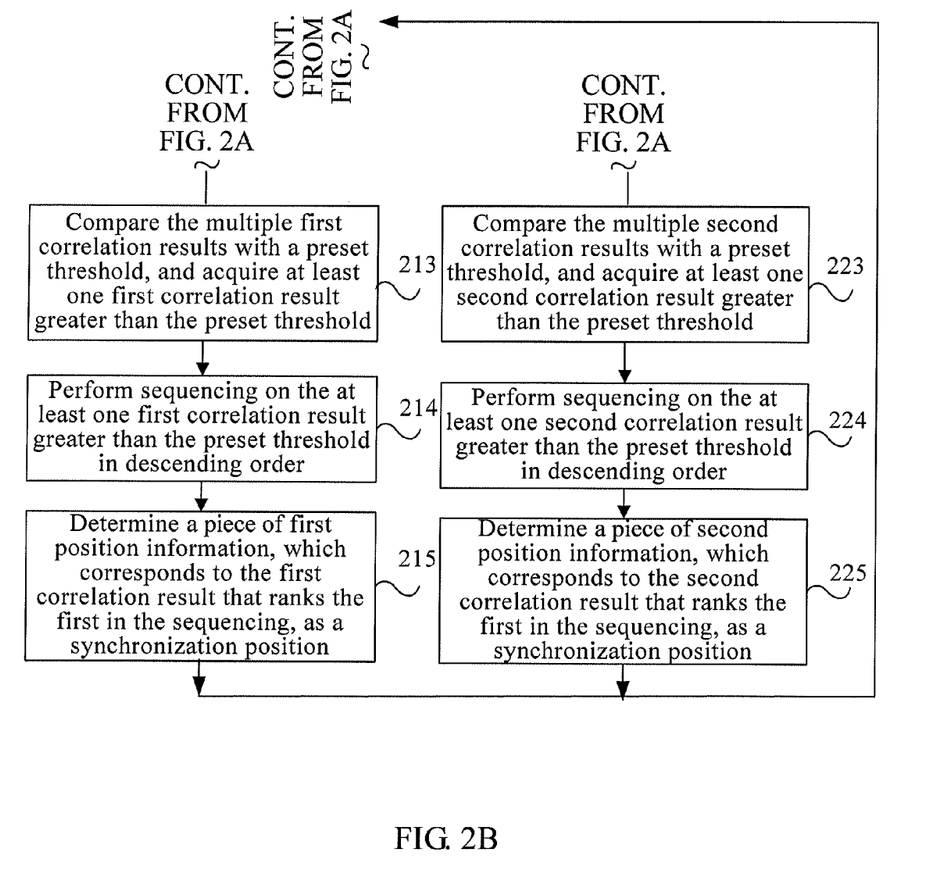

FIGS. 2A and 2B describe a flowchart of a method for detecting a synchronization position of an LTE cell according to a second embodiment of the present invention. In the second embodiment of the present invention, the method described in the first embodiment of the present invention is applied in time division duplex (Time Division Duplex, TDD for short) mode. As shown in FIGS. 2A and 2B, the method for detecting a synchronization position of an LTE cell according to the second embodiment of the present invention includes the following process.

Step 201: Power on a terminal device.

Step 202: Maintain a cell synchronization list.

Step 203: Determine whether valid synchronization information is found.

If yes, enter a search mode with windowing, and perform step 211. Specifically, in a case where the valid synchronization information has been found, that is, the valid synchronization information already exists in the cell synchronization list, the search mode with windowing may be used.

Otherwise, enter a search mode without windowing, and perform step 221. Specifically, when the terminal device is powered on, the cell synchronization list is null at this time, and therefore, the search mode without windowing is used, so that as many cells are found as possible and the cells are written into the cell synchronization list. In a search mode without windowing, all sampling points in one search cycle participate in subsequent operations such as correlation, comparison, and sequencing.

In this step, a specific method for determining whether valid synchronization information is found is not limited. Any method for determining the valid synchronization information may be used; for example, whether an available cell is found may be determined in an upper layer of an access network.

Step 211: Acquire all sampling points of received data, and select a part of sampling points from all the sampling points of the received data.

Specifically, in this step, the received data is generated by filtering a local sequence from a base station. In the search mode with windowing, sampling points whose synchronization positions are most likely to be found are selected from all the sampling points for calculation. Because the TDD standard is a synchronization system and cells are distributed near a cell with the strongest signal, windowing needs to be performed in a position where the cell with the strongest signal is located, and then a purpose for subsequently maintaining and updating information of a cell can be achieved. Therefore, in this step, a specific method may be used as follows, that is, a part of sampling points are selected from all the sampling points of the received data: From all the sampling points of the received data and by taking the position of the cell with the strongest signal as a center, sampling points within the width of a preset window are selected as a selected part of the sampling points. In a practical application, a random access memory (Random Access Memory, RAM for short) may be used to receive all the sampling points of the received data, and the part of the sampling points among all the sampling points are cached by controlling the RAM, so that selecting the part of the sampling points from all the sampling points of the received data is implemented. Specifically, the cell with the strongest signal may be acquired by using an existing method for detecting a synchronization position of an LTE cell or according to historical detection experience; a maximum value is acquired from correlation operation results of an existing detection; and a cell corresponding to the maximum value is taken as the cell with the strongest signal. The width of the window may be preset flexibly according to a practical network environment and/or detection accuracy requirement.

Step 212: Carry out correlation operations on the part of the sampling points, and obtain multiple first correlation results and multiple pieces of first position information that correspond to the part of the sampling points.

In this step, the part of the sampling points among all the sampling points of the received data output by the RAM may be received, and by using a time division multiplexing working manner, correlation operations are carried out on the part of the sampling points output by the RAM. Specifically, the correlation operations carried out on the part of the sampling points include carrying out three correlation operations, that is, NID2=0, NID2=1, and NID2=2, on the part of the sampling points. Specifically, each correlation operation is complex multiplication and accumulation that are carried out on the part of the sampling points.

Step 213: Compare the multiple first correlation results with a preset threshold, and acquire at least one first correlation result greater than the preset threshold.

Step 214: Perform sequencing on the at least one first correlation result greater than the preset threshold in descending order.

Step 215: Determine a piece of first position information, which corresponds to a first correlation result that ranks the first in the sequencing, as a synchronization position.

After step 215, return to step 202.

Step 221: Acquire all sampling points of received data.

Specifically, in this step, the received data is generated by filtering a local sequence from a base station. In a practical application, the RAM in step 211 may still be used to receive all the sampling points, and all the sampling points are cached by controlling the RAM in step 221.

Step 222: Carry out correlation operations on all the sampling points, and obtain multiple second correlation results and multiple pieces of second position information that correspond to all the sampling points.

In this step, all the sampling points of the received data output by the RAM may be received, and by using a time division multiplexing working manner, correlation operations are carried out on all the sampling points output by the RAM.

Step 223: Compare the multiple second correlation results with a preset threshold, and acquire at least one second correlation result greater than the preset threshold.

Step 224: Perform sequencing on the at least one second correlation result greater than the preset threshold in descending order.

Step 225: Determine a piece of second position information, which corresponds to a second correlation result that ranks the first in the sequencing, as a synchronization position.

After step 225, return to step 202.

In the second embodiment of the present invention, a part of sampling points are selected from all sampling points by using a search mode with windowing, so that a large number of correlation operations are saved, and meanwhile, operations such as comparison and sequencing are saved. By saving the operation amount, power consumption and a cost for detecting a synchronization position of an LTE cell are reduced. In addition, in TDD mode, whether valid synchronization information is found is determined, so that in a case where the valid synchronization information is found, a search mode with windowing is used, and in a case where no valid synchronization information is found, a search mode without windowing is used; and operations are carried out on all the sampling points, thereby ensuring that a synchronization position can be detected successfully in any case. In addition, required sampling points are cached by using a RAM, which, compared with a manner of using a register to store a sampling point, further reduces a cost of a hardware device for detecting the synchronization position of the LTE cell.

Figure 3A:
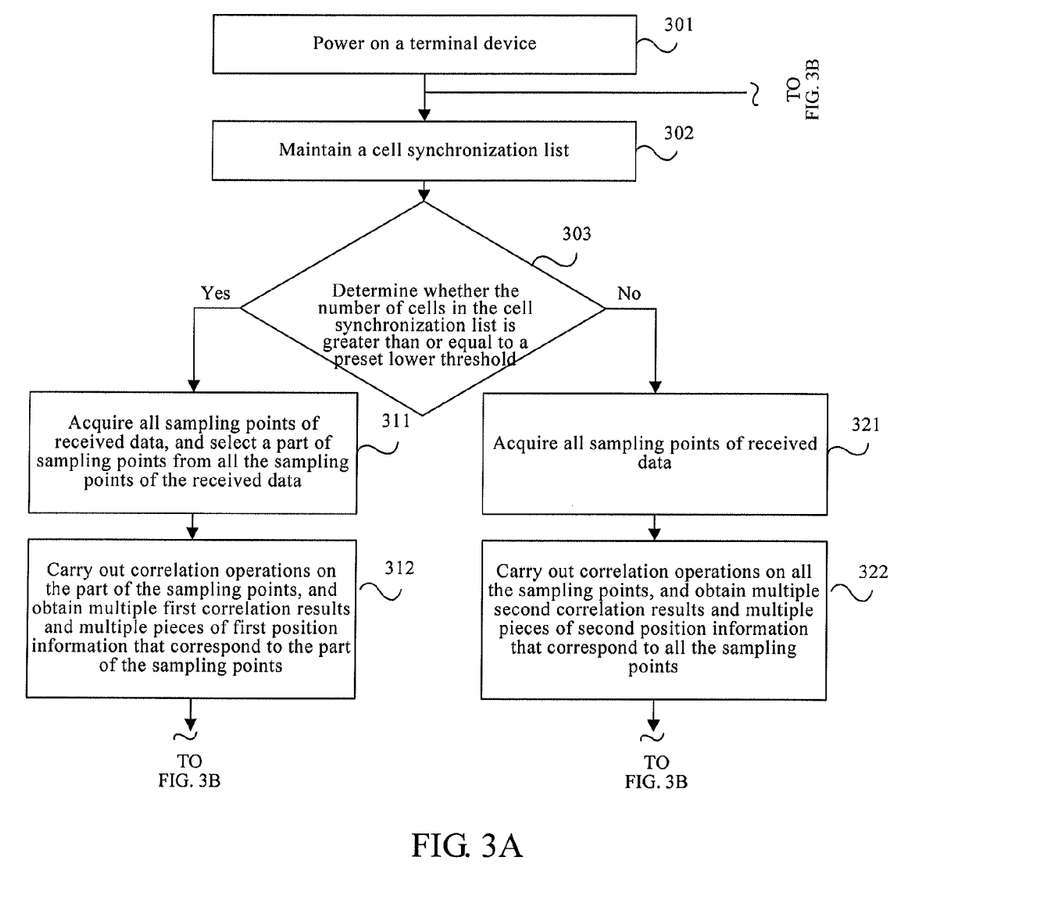
FIGS. 3A and 3B describe a flowchart of a method for detecting a synchronization position of an LTE cell according to a third embodiment of the present invention.
Figure 3B:
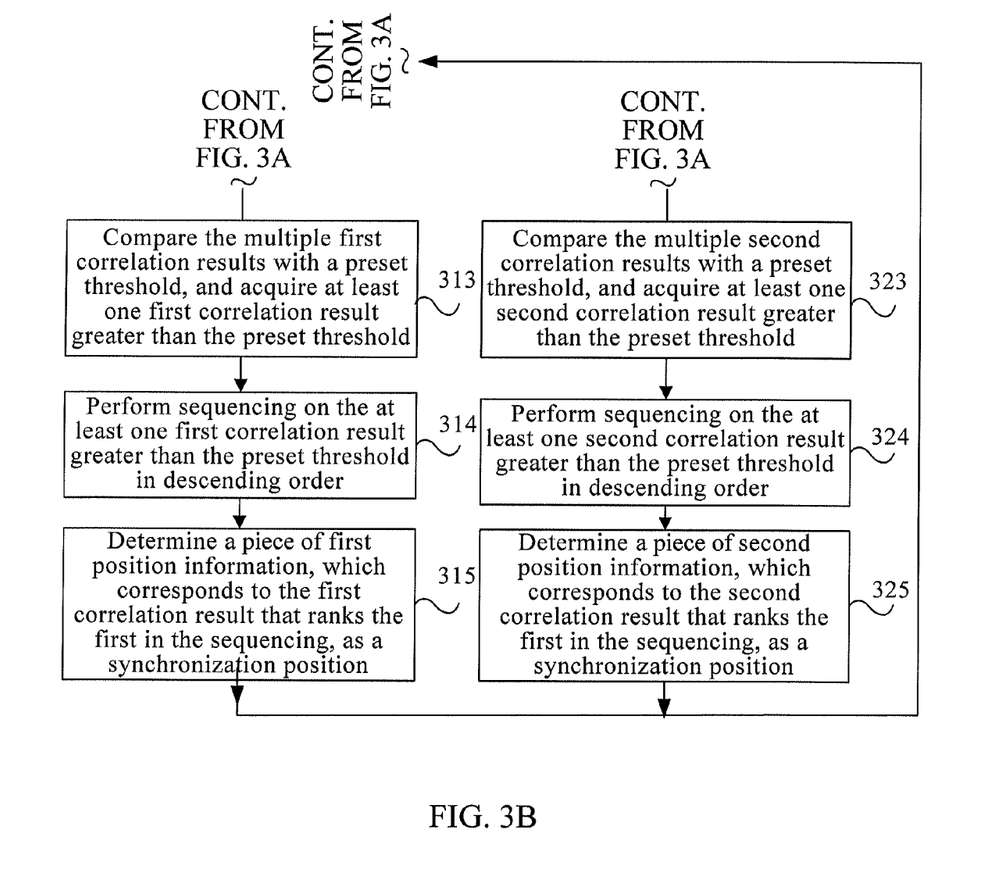

FIGS. 3A and 3B describe is a flowchart of a method for detecting a synchronization position of an LTE cell according to a third embodiment of the present invention. In the third embodiment of the present invention, the method described in the first embodiment of the present invention is applied in frequency division duplex (Frequency Division Duplex, FDD for short) mode. As shown in FIGS. 3A and 3B describe, the method for detecting a synchronization position of an LTE cell according to the third embodiment of the present invention includes the following process.

Step 301: Power on a terminal device.

Step 302: Maintain a cell synchronization list.

Step 303: Determine whether the number of cells in the cell synchronization list is greater than or equal to a preset lower threshold.

If yes, enter a search mode with windowing, and perform step 311. Specifically, in a case where the number of cells in the cell synchronization list is greater than or equal to the preset lower threshold, that is, enough cells exist in the cell synchronization list, the search mode with windowing may be used.

Otherwise, enter a search mode without windowing, and perform step 321. Specifically, in a case where the number of cells in the cell synchronization list is less than the preset lower threshold, if a camping cell is lost and a small number of cells that are left in the cell synchronization list cannot be camped on, the terminal device breaks connection to a base station. To avoid such phenomenon, when the number of cells in the cell synchronization list is less than the preset lower threshold, the search mode without windowing is used, so as to find as many cells as possible and write the cells into the cell synchronization list. In a search mode without windowing, all sampling points in one search cycle participate in subsequent operations such as correlation, comparison, and sequencing.

In this step, the lower threshold may be configured flexibly according to a practical network environment and/or detection accuracy requirement, and a specific value configured for the lower threshold may be obtained through a test or emulation.

Step 311: Acquire all sampling points of received data, and select a part of sampling points from all the sampling points of the received data.

Specifically, in this step, the received data is generated by filtering a local sequence from a base station. In the search mode with windowing, the sampling points whose synchronization positions are most likely to be found are selected from all the sampling points for calculating. Because a synchronization header of the FDD standard may appear at any time, multiple times of windowing are performed according to a synchronization position of a cell in a currently stored cell synchronization list for performing a search. Therefore, in this step, a specific method may be used as follows: From all the sampling points of the received data and by taking a position of at least one cell in the cell synchronization list as a center, sampling points within the width of a preset window are selected as a selected part of the sampling points. Because the cell synchronization list may include multiple cells, the part of the sampling points are selected by taking the position of a cell in the cell synchronization list as the center. That is, each cell in the cell synchronization list is taken as a center to perform windowing, sampling points in each window are a part of sampling points selected by the window, and multiple times of windowing are performed according to the cell synchronization list. In a practical application, a RAM may be used to receive all the sampling points of the received data, and the part of the sampling points among all the sampling points are cached by controlling the RAM, so that selecting the part of the sampling points from all the sampling points of the received data is implemented.

Step 312: Carry out correlation operations on the part of the sampling points, and obtain multiple first correlation results and multiple pieces of first position information that correspond to the part of the sampling points.

In this step, the part of the sampling points among all the sampling points of the received data output by the RAM may be received, and by using a time division multiplexing working manner, correlation operations are carried out on the part of the sampling points output by the RAM.

Step 313: Compare the multiple first correlation results with a preset threshold, and acquire at least one first correlation result greater than the preset threshold.

Step 314: Perform sequencing on the at least one first correlation result greater than the preset threshold in descending order.

Step 315: Determine a piece of first position information, which corresponds to a first correlation result that ranks the first in the sequencing, as a synchronization position.

After step 315, return to step 302.

Step 321: Acquire all sampling points of received data.

Specifically, in this step, the received data is generated by filtering a local sequence from a base station. In a practical application, the RAM in step 311 may still be used to receive all the sampling points, and all the sampling points are cached by controlling the RAM in step 321.

Step 322: Carry out correlation operations on all the sampling points, and obtain multiple second correlation results and multiple pieces of second position information that correspond to all the sampling points.

In this step, all the sampling points of the received data output by the RAM may be received, and by using a time division multiplexing working manner, correlation operations are carried out on all the sampling points output by the RAM.

Step 323: Compare the multiple second correlation results with a preset threshold and acquire at least one second correlation result greater than the preset threshold.

Step 324: Perform sequencing on the at least one second correlation result greater than the preset threshold in descending order.

Step 325: Determine a piece of second position information, which corresponds to a second correlation result that ranks the first in the sequencing, as a synchronization position.

After step 325, return to step 302.

In the third embodiment of the present invention, a part of sampling points are selected from all sampling points by using a search mode with windowing, so that a large number of correlation operations are saved, and meanwhile, the operations such as comparison and sequencing are saved. by saving the operation amount, power consumption and a cost for detecting a synchronization position of an LTE cell are reduced. In addition, in FDD mode, whether the number of cells in a cell synchronization list is greater than or equal to a preset lower threshold is determined, so that in a case where the number of the cells in the cell synchronization list is greater than or equal to the preset lower threshold, a search mode with windowing is used, and in a case where the number of the cells in the cell synchronization list is less than the preset lower threshold, a search mode without windowing is used; and operations are carried out on all the sampling points, thereby ensuring that a synchronization position can be detected successfully in any case. In addition, required sampling points are cached by using a RAM, which, compared with a manner of using a register to store a sampling point, further reduces a cost of a hardware device for detecting the synchronization position of the LTE cell.

Figure 4:
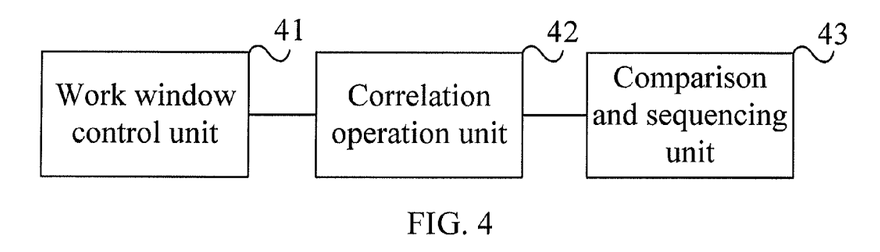
FIG. 4 is a schematic structural diagram of an apparatus for detecting a synchronization position of an LTE cell according to a fourth embodiment of the present invention.

FIG. 4 is a schematic structural diagram of an apparatus for detecting a synchronization position of an LTE cell according to a fourth embodiment of the present invention. As shown in FIG. 4, the apparatus at least includes a work window control unit 41, a correlation operation unit 42, and a comparison and sequencing unit 43.

The work window control unit 41 is configured to select a part of sampling points from all sampling points of received data, where the received data is generated by filtering a local sequence from a base station.

The correlation operation unit 42 is configured to carry out correlation operations on the part of the sampling points, and obtain multiple first correlation results and multiple pieces of first position information that correspond to the part of the sampling points.

The comparison and sequencing unit 43 is configured to determine a maximum first correlation result among at least one first correlation result greater than a preset threshold in the multiple first correlation results and take a piece of first position information, which corresponds to the maximum first correlation result, as a synchronization position.

In the fourth embodiment of the present invention, a work window control unit selects a part of sampling points from all sampling points of received data, a correlation operation unit carries out correlation operations only on the selected part of the sampling points, and a comparison and sequencing unit performs executions such as comparison and sequencing only on correlation operation results of the part of the sampling points to acquire a synchronization position. The work window control unit selects the part of the sampling points from all the sampling points, so that a large number of correlation operations of the correlation operation unit are saved, and meanwhile, operations such as comparison and sequencing of the comparison and sequencing unit are saved. By saving the operation amount, power consumption for detecting a synchronization position of an LTE cell is reduced. In addition, by saving the operations, an operation processing capability required by a hardware device is lowered, and a cost of the apparatus is reduced.

Based on the foregoing technical solution, if the apparatus works in TDD mode, specifically, the work window control unit 41 is further configured to determine, in TDD mode, whether valid synchronization information is found.

If yes, that is, the valid synchronization information is found, the work window control unit 41 selects the part of the sampling points from all the sampling points of the received data. Specifically, the work window control unit 41 selects, from all the sampling points of the received data and by taking the position of a cell with the strongest signal as a center, sampling points within the width of a preset window as the selected part of the sampling points. In this case, the correlation operation unit 42 is configured to carry out the correlation operations on the part of the sampling points, and obtain the multiple first correlation results and the multiple pieces of first position information that correspond to the part of the sampling points. The comparison and sequencing unit 43 is configured to determine a maximum first correlation result among the at least one first correlation result greater than the preset threshold in the multiple first correlation results, and take the piece of first position information, which corresponds to the maximum first correlation result, as the synchronization position.

If no, that is, no valid synchronization information is found, the work window control unit 41 selects all the sampling points of the received data. In this case, the correlation operation unit 42 is further configured to carry out correlation operations on all the sampling points of the received data, and obtain multiple second correlation results and multiple pieces of second position information that correspond to all the sampling points. The comparison and sequencing unit 43 is further configured to determine a maximum second correlation result among at least one second correlation result greater than a preset threshold in the multiple second correlation results, and take the piece of second position information, which corresponds to the maximum second correlation result, as a synchronization position.

In TDD mode, the work window control unit 41 determines whether valid synchronization information is found. In a case where the valid synchronization information is found, a search mode with windowing is used, and operations are carried out only on a part of sampling points among all sampling points, so that an operation processing process is simplified, power consumption and an operation capability requirement on a hardware device is lowered, and a cost is reduced. In a case where no valid synchronization information is found, a search mode without windowing is used, and operations are carried out on all the sampling points, thereby ensuring that a synchronization position can be detected successfully.

Based on the foregoing technical solution, if the apparatus works in FDD mode, specifically, the work window control unit 41 is further configured to determine, in FDD mode, whether the number of cells in a cell synchronization list is greater than or equal to a preset lower threshold.

If yes, that is, the number of the cells in the cell synchronization list is greater than or equal to the preset lower threshold, the work window control unit 41 selects the part of the sampling points from all the sampling points of the received data. Specifically, the work window control unit 41 selects, from all the sampling points of the received data and by taking the position of at least one cell in the cell synchronization list as a center, the sampling points within the width of a preset window as the selected part of the sampling points. In this case, the correlation operation unit 42 is configured to carry out the correlation operations on the part of the sampling points, and obtain the multiple first correlation results and the multiple pieces of first position information that correspond to the part of the sampling points. The comparison and sequencing unit 43 is configured to determine the maximum first correlation result among the at least one first correlation result greater than the preset threshold in the multiple first correlation results, and take the piece of first position information, which corresponds to the maximum first correlation result, as the synchronization position.

If no, that is, the number of the cells in the cell synchronization list is less than the preset lower threshold, the work window control unit 41 selects all the sampling points of the received data. In this case, the correlation operation unit 42 is further configured to carry out the correlation operations on all the sampling points of the received data, and obtain multiple second correlation results and multiple pieces of second position information that correspond to all the sampling points. The comparison and sequencing unit 43 is further configured to determine a maximum second correlation result among at least one second correlation result greater than a preset threshold, and take the piece of second position information in the multiple second correlation results, which corresponds to the maximum second correlation result, as a synchronization position.

In FDD mode, the work window control unit 41 determines whether the number of cells in a cell synchronization list is greater than or equal to a preset lower threshold. In a case where the number of the cells in the cell synchronization list is greater than or equal to the preset lower threshold, a search mode with windowing is used, and operations are carried out only on a part of sampling points among all sampling points, so that an operation processing process is simplified, power consumption and an operation capability requirement on a hardware device is lowered, and a cost is reduced. In a case where the number of cells in the cell synchronization list is less than the preset lower threshold, a search mode without windowing is used, and operations are carried out on all the sampling points, thereby ensuring that a synchronization position can be detected successfully.

Figure 5:
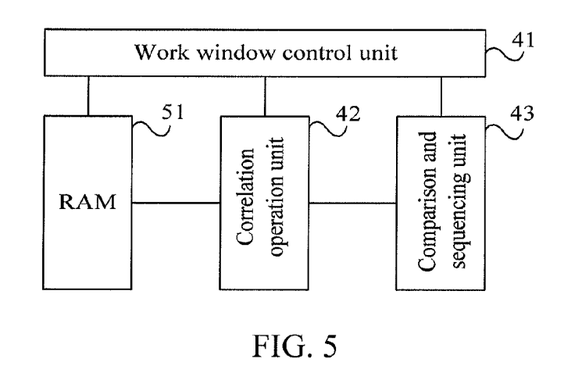
FIG. 5 is a schematic structural diagram of an apparatus for detecting a synchronization position of an LTE cell according to a fifth embodiment of the present invention.

FIG. 5 is a schematic structural diagram of an apparatus for detecting a synchronization position of an LTE cell according to a fifth embodiment of the present invention. As shown in FIG. 5, the apparatus not only includes the work window control unit 41, the correlation operation unit 42, and the comparison and sequencing unit 43 that are included in the apparatus for detecting a synchronization position of an LTE cell according to the fourth embodiment of the present invention shown in FIG. 4, but also includes a RAM 51. After the RAM 51 is added, the apparatus for detecting a synchronization position of an LTE cell may use two specific implementation manners. In manner 1, the work window control unit 41 only controls the RAM 51; and in manner 2, the work window control unit 41 controls the RAM 51, the correlation operation unit 42, and the comparison and sequencing unit 43. FIG. 5 only shows a case of manner 2.

Manner 1

The work window control unit 41, the correlation operation unit 42, and the comparison and sequencing unit 43 not only perform the functions in the fourth embodiment of the present invention, but also include the following functions.

The work window control unit 41 is further configured to start the RAM 51 when a part of sampling points are selected from all sampling points of received data and a current sampling point belongs to the part of the sampling points, and stop the RAM 51 when a part of sampling points are selected from all sampling points of received data and a current sampling point does not belong to the part of the sampling points. In addition, the work window control unit 41 is further configured to start the RAM 51 when selecting all the sampling points of received data.

The RAM 51 is configured to receive all the sampling points of the received data, and start or stop under control of the work window control unit 41; and in a start state, cache the received sampling points and output them to the correlation operation unit 42, and in a stop state, cache no sampling points.

In this way, the RAM 51 outputs required sampling points to the correlation operation unit 42 under the control of the work window control unit 41. If all the sampling points of the received data need to be processed currently, the work window control unit 41 controls the RAM 51 to stay in the start state all the time, so that the RAM 51 outputs all the sampling points of the received data to the correlation operation unit 42 after caching all the sampling points of the received data. If a part of the sampling points need to be selected currently from all the sampling points of the received data for processing: the work window control unit 41 controls the RAM 51 to stay in the start state, when a current sampling point belongs to the selected part of the sampling points; and controls the RAM 51 to stay in the stop state, when a current sampling point does not belong to the selected part of the sampling points. In this way, the RAM 51 outputs the part of the sampling points to the correlation operation unit 42 after caching the part of the sampling points among all the sampling points of the received data.

Accordingly, the correlation operation unit 42 connects to the RAM 51, and carries out correlation operations on the sampling points output by the RAM 51. In this way, when the RAM 51 outputs the part of the sampling points, the correlation operations is carried out on the part of the sampling points, and multiple first correlation results and multiple pieces of first position information that correspond to the part of the sampling points are obtained; and when the RAM 51 outputs all the sampling points, correlation operations are carried out on all the sampling points, and multiple second correlation results and multiple pieces of second position information that correspond to all the sampling points are obtained. The comparison and sequencing unit 43 connects to the correlation operation unit 42, performs comparison and sequencing on multiple correlation results output by the correlation operation unit 42, acquires a maximum correlation result greater than a preset threshold in the multiple correlation results, and takes a piece of position information, which corresponds to the correlation result, as a synchronization position. Specifically, when the RAM 51 outputs the part of the sampling points, the comparison and sequencing unit 43 performs the comparison and sequencing on the multiple first correlation results, acquires a maximum first correlation result greater than the preset threshold in the multiple first correlation results, and takes a piece of first position information, which corresponds to the first correlation result, as the synchronization position; when the RAM 51 outputs all the sampling points, the comparison and sequencing unit 43 performs the comparison and sequencing on the multiple second correlation results, acquires a maximum second correlation result greater than the preset threshold in the multiple second correlation results, and takes a piece of second position information, which corresponds to the second correlation result, as the synchronization position.

Method 2

The work window control unit 41, the correlation operation unit 42, and the comparison and sequencing unit 43 not only perform the functions in the fourth embodiment of the present invention, but also include the following functions.

The work window control unit 41 is further configured to start the RAM 51, the correlation operation unit 42, and the comparison and sequencing unit 43 when a part of sampling points are selected from all sampling points of received data and a current sampling point belongs to the part of the sampling points, and stop the RAM 51, the correlation operation unit 42, and the comparison and sequencing unit 43 when a part of sampling points are selected from all sampling points of received data and a current sampling point does not belong to the part of the sampling points. In addition, the work window control unit 41 is further configured to start the RAM 51, the correlation operation unit 42, and the comparison and sequencing unit 43 when selecting all sampling points of received data.

The RAM 51 is configured to receive all the sampling points of the received data, and start or stop under control of the work window control unit 41; and in a start state, cache the received sampling points and output them to the correlation operation unit 42, and in a stop state, cache no sampling points.

In this way, the RAM 51 outputs required sampling points to the correlation operation unit 42 under the control of the work window control unit 41. If all the sampling points of the received data need to be processed currently, the work window control unit 41 controls the RAM 51 to stay in the start state all the time, so that the RAM 51 outputs all the sampling points of the received data to the correlation operation unit 42 after caching all the sampling points of the received data. If a part of the sampling points need to be selected currently from all the sampling points of the received data for processing: the work window control unit 41 controls the RAM 51 to stay in the start state, when a current sampling point belongs to the selected part of the sampling points; and controls the RAM 51 to stay in the stop state, when a current sampling point does not belong to the selected part of the sampling points. In this way, the RAM 51 outputs the part of the sampling points to the correlation operation unit 42 after caching the part of the sampling points among all the sampling points of the received data.

In addition, the work window control unit 41 further controls the correlation operation unit 42. If all the sampling points of the received data need to be processed currently, the work window control unit 41 controls the correlation operation unit 42 to stay in the start state all the time, so that the correlation operation unit 42 carries out correlation operations on all the sampling points of the received data, and obtains multiple second correlation results and multiple pieces of second position information that correspond to all the sampling points. If a part of the sampling points need to be selected currently from all the sampling points of the received data for processing: the work window control unit 41 controls the correlation operation unit 42 to stay in the start state, when a current sampling point belongs to the selected part of the sampling points; and controls the correlation operation unit 42 to stay in the stop state, when a current sampling point does not belong to the selected part of the sampling points. In this way, the correlation operation unit 42 carries out a correlation operations on the part of the sampling points among all the sampling points of the received data, and obtains multiple first correlation results and multiple pieces of first position information that correspond to the part of the sampling points.

In addition, the work window control unit 41 further controls the comparison and sequencing unit 43. If all the sampling points of the received data need to be processed currently, the work window control unit 41 controls the comparison and sequencing unit 43 to stay in the start state all the time, so that the comparison and sequencing unit 43 performs comparison and sequencing on the multiple second correlation results obtained for all the sampling points of the received data, acquires a maximum second correlation result greater than a preset threshold in the multiple second correlation results, and takes a piece of second position information, which corresponds to the second correlation result, as a synchronization position. If a part of the sampling points need to be selected currently from all the sampling points of the received data for processing: the work window control unit 41 controls the comparison and sequencing unit 43 to stay in the start state, when a current sampling point belongs to the selected part of the sampling points; and controls the comparison and sequencing unit 43 to stay in the stop state, when a current sampling point does not belong to the selected part of the sampling points, in this way, the comparison and sequencing unit 43 performs comparison and sequencing on the multiple first correlation results obtained for the part of the sampling points among all the sampling points of the received data, acquires a maximum first correlation result greater than the preset threshold in the multiple first correlation results, and takes a piece of first position information, which corresponds to the first correlation result, as the synchronization position.

In the fifth embodiment of the present invention, a work window control unit selects a part of sampling points from all sampling points, so that a large number of correlation operations carried out by a correlation operation unit are saved, and meanwhile, operations such as comparison and sequencing carried out by a comparison and sequencing unit are saved. By saving the operation amount, power consumption and a cost of an apparatus for detecting a synchronization position of an LTE cell are reduced. In addition, required sampling points are cached by using a RAM, which, compared with a manner of using a register to store a sampling point, further reduces the cost of the apparatus for detecting the synchronization position of the LTE cell.

The methods for detecting a synchronization position of an LTE cell in the first embodiment of the present invention and the second embodiment of the present invention and the apparatuses for detecting a synchronization position of an LTE cell in the third embodiment to the fifth embodiment of the present invention may not only be applied to a primary synchronization detection process, but also be applied to a secondary synchronization detection process. When they are applied to primary synchronization detection, an acquired synchronization position is a primary synchronization position, and a number of the primary synchronization position in a group is taken as an NID2 value. When they apply to secondary synchronization detection, an acquired synchronization position is a secondary synchronization position, and a number of the secondary synchronization position in a group is taken as an NID1 value.

Figure 6:
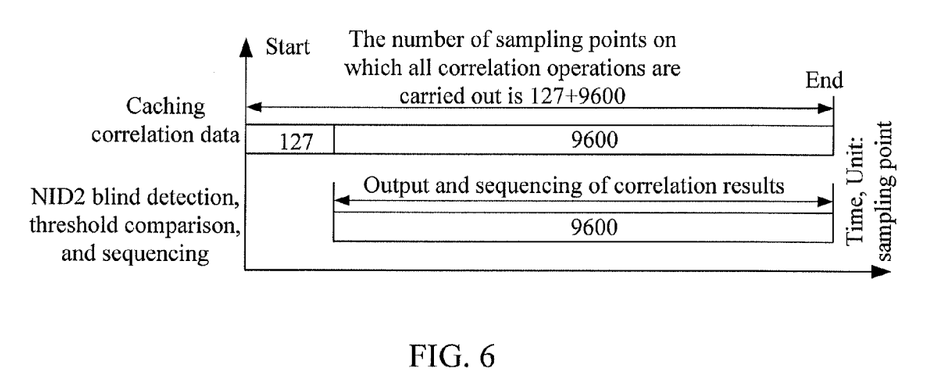
FIG. 6 is a schematic diagram of working time in a search mode without windowing according to the first to fifth embodiments of the present invention.
Figure 7:
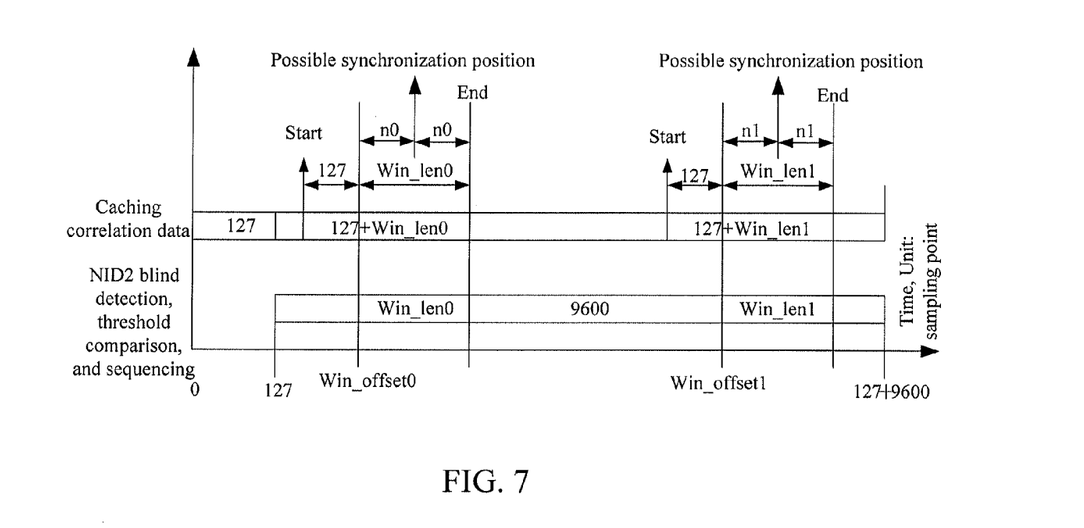
FIG. 7 is a schematic diagram of working time in a search mode with windowing according to the first to fifth embodiments of the present invention.

FIG. 6 is a schematic diagram of working time in a search mode without windowing according to the first to fifth embodiments of the present invention. FIG. 7 is a schematic diagram of working time in a search mode with windowing according to the first to fifth embodiments of the present invention. Refer to FIG. 6 and FIG. 7, in which a time point when correlation data caching starts indicates a time point when an RAM starts, and a time point when the correlation data caching ends indicates a time point when the RAM stops. A time point when NID2 blind detection, threshold comparison, and sequencing start indicates a time point when a correlation operation unit starts a correlation operation and a time point when a comparison and sequencing unit starts comparison and sequencing; and a time point when the NID2 blind detection, threshold comparison, and sequencing end indicates a time point when the correlation operation unit stops a correlation operation and a time point when the comparison and sequencing unit stops comparison and sequencing. In FIG. 6, the search mode without windowing is used, and in one search cycle, that is, within time of all the sampling points, the RAM, the correlation operation unit, and the comparison and sequencing unit are all in a start working state. In FIG. 7, the search mode with windowing is used, and FIG. 7 shows a case where two times of windowing are performed in one search cycle. In FIG. 7, n0 indicates half width of a first window, win_len0 indicates the width of the first window, and win_offset0 indicates an offset position of the first window; n1 indicates half width of a second window, win_len1 indicates the width of the second window, and win_offset1 indicates an offset position of the second window.

Figure 8:
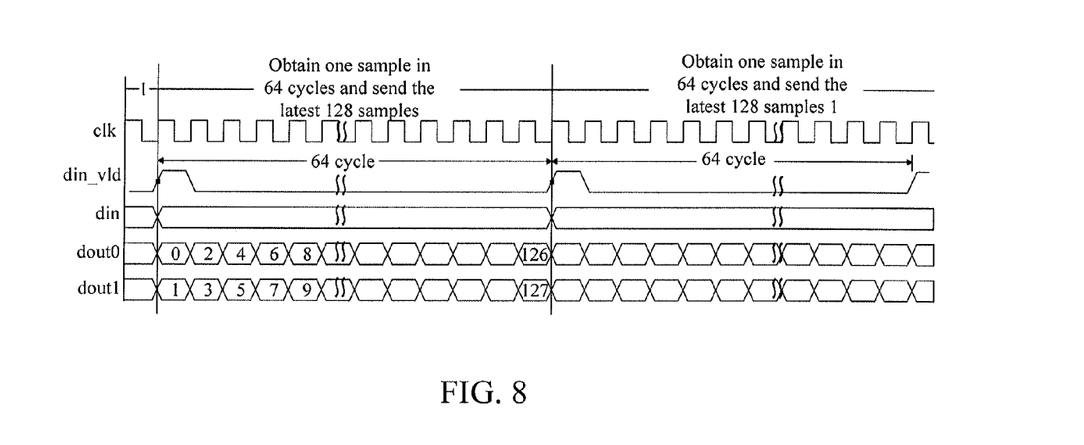
FIG. 8 is a schematic diagram of a time sequence of a caching operation according to the first to fifth embodiments of the present invention.

In the first embodiment of the present invention to the fifth embodiment of the present invention, the RAM is used to cache the sampling points. If a shift register is used for caching, a large number of shift registers are required. As a result, the area of a hardware chip of an apparatus for detecting a synchronization position of an LTE cell is large, and power consumption of the chip is high. If the RAM is used to replace the register, the area and power consumption of the hardware chip of the apparatus can be reduced. In addition, an operating frequency of a chip is much higher than a sampling frequency. Therefore, a time division multiplexing mode may be used for subsequent correlation operations. In each clock cycle, the number of the sampling points output by the RAM is 245.76 MHz/current operating frequency of the chip. Take an operating frequency 122.88 MHz as an example. In this case, the number of the sampling points output by the RAM is 2 per clock cycle. Therefore, a time division multiplexing manner may be used for the correlation operation unit. Specifically, input and output time sequences of the RAM are shown in FIG. 8. FIG. 8 is a schematic diagram of a time sequence of a caching operation according to the first to fifth embodiments of the present invention. In FIG. 8, clk indicates a search cycle; din_vld indicates that data is valid; din indicates input data; dout0 indicates a first output sequence; and dout1 indicates a second output sequence. For the correlation operation unit, the time division multiplexing working manner is used. Multiple complex multiplication modules and one accumulation module are included inside the correlation operation unit. The operating frequency 122.88 MHz is still taken as an example. A circuit of the correlation operation unit also uses the operating frequency 122.88 MHz, and the actual number of complex multiplications is 245.76 MHz/current operating frequency. The number of the complex multiplication modules in a correlation operation unit is related to the number of clock cycles taken for effectively outputting a valid correlation result once. The larger the number of the clock cycles is, the smaller the number of the complex multiplication modules is.

It should be noted that, for brief description, the foregoing method embodiments are described as a series of actions. However, persons skilled in the art should understand that the present invention is not limited to the order of the described actions, because according to the present invention, some steps may adopt other order or occur simultaneously. Moreover, persons skilled in the art should also understood that the described embodiments all belong to exemplary embodiments, and the involved actions and modules are not necessarily required by the present invention.

In the foregoing embodiments, the description of each of the embodiments has respective focuses. For a part that is not described in detail in a certain embodiment, reference may be made to related descriptions in other embodiments.

Persons of ordinary skill in the art may understand that all or part of the steps of the methods in the embodiments may be implemented by a program instructing relevant hardware. The program may be stored in a computer readable storage medium. When the program is run, the steps of the forgoing methods in the embodiments are performed. The storage medium includes any medium that is capable of storing program codes, such as a ROM, a RAM, a magnetic disk, or an optical disk.

Finally, it should be noted that the foregoing embodiments are merely used for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof; and these modifications or replacements do not make essence of corresponding technical solutions depart from the technical scope of the technical solutions of the embodiments of the present invention.

What is claimed is:

1. A method for detecting a synchronization position of a long term evolution LTE cell, comprising:
selecting by a terminal device, a part of sampling points from all sampling points of received data via receiving through an antenna of the terminal device, wherein the selected part of sampling points are output by a memory, and the received data is generated by filtering a local sequence from a base station, wherein the selecting of the part of sampling points from all sampling points of the received data comprises:
selecting by the terminal device, from all the sampling points of the received data and by taking a position of a cell with the strongest signal as a center, sampling points within the width of a preset window as the part of the sampling points;
carrying out by the terminal device, correlation operations on the part of the sampling points, and obtaining multiple first correlation results and multiple pieces of first position information that correspond to the part of the sampling points; and
determining by the terminal device, a maximum first correlation result among at least one first correlation result greater than a preset threshold in the multiple first correlation, and taking a piece of first position information, which corresponds to the maximum first correlation result, as a synchronization position.

2. The method according to claim 1, before the selecting the part of sampling points from all sampling points of received data, further comprising:
determining by the terminal device, in time division duplex TDD mode, whether valid synchronization information is found, and, if yes, performing the step of selecting the part of sampling points from all sampling points of received data.

3. The method according to claim 2, further comprising:
in the TDD mode, when it is determined that no valid synchronization information is found, carrying out correlation operations on all the sampling points of the received data, and obtaining multiple second correlation results and multiple pieces of second position information that correspond to all the sampling points; and
determining by the terminal device, a maximum second correlation result among at least one second correlation result greater than a preset threshold in the multiple second correlation results, and taking a piece of second position information, which corresponds to the maximum second correlation result, as the synchronization position.

4. The method according to claim 1, before the selecting the part of sampling points from all sampling points of received data, further comprising:
determining by the terminal device, in frequency division duplex FDD mode, whether the number of cells in a cell synchronization list is greater than or equal to a preset lower threshold, and, if yes, performing the step of selecting the part of sampling points from all sampling points of received data.

5. The method according to claim 4, further comprising:
in the FDD mode, when it is determined that the number of cells in the cell synchronization list is less than the preset lower threshold, carrying out correlation operations on all the sampling points of the received data, and obtaining multiple second correlation results and multiple pieces of second position information that correspond to all the sampling points; and
determining by the terminal device, a maximum second correlation result among at least one second correlation result greater than a preset threshold in the multiple second correlation results, and taking the piece of second position information, which corresponds to the maximum second correlation result, as the synchronization position.

6. The method according to claim 1, wherein the selecting the part of sampling points from all sampling points of received data comprises:
selecting by the terminal device, from all the sampling points of the received data and by taking a position of at least one cell in the cell synchronization list as a center, sampling points within the width of a preset window as the part of the sampling points.

7. The method according to claim 1, wherein:
the selecting the part of sampling points from all sampling points of received data comprises: controlling a random access memory RAM to cache the part of the sampling points among all the sampling points of the received data; and
the carrying out correlation operations on the part of the sampling points comprises: by using a time division multiplexing working manner, carrying out the correlation operations on the part of the sampling points output by the RAM.

8. An apparatus for detecting a synchronization position of a long term evolution LTE cell, comprising program instructing relevant hardware executing program codes stored in a non-transitory computer readable storage medium to perform functions, which configures the apparatus to:
select a part of sampling points from all sampling points of received data, and by taking a position of a cell with the strongest signal as a center, the sampling points within the width of a preset window as the part of the sampling points, wherein the received data is generated by filtering a local sequence from a base station;
carry out correlation operations on the part of the sampling points, and obtain multiple first correlation results and multiple pieces of first position information that correspond to the part of the sampling points; and
determine a maximum first correlation result among at least one first correlation result greater than a preset threshold in the multiple first correlation results and take a piece of first position information, which corresponds to the maximum first correlation result as a synchronization position.

9. The apparatus according to claim 8, wherein the apparatus is further configured to:
determine, in time division duplex TDD mode whether valid synchronization information is found, and, if yes, select the part of the sampling points from all the sampling points of the received data.

10. The apparatus according to claim 9, wherein the apparatus is further configured to:
to select all the sampling points of the received data in the TDD mode and when it is determined that no valid synchronization information is found;
carry out correlation operations on all the sampling points of the received data, and obtain multiple second correlation results and multiple pieces of second position information that correspond to all the sampling points; and determine a maximum second correlation result among at least one second correlation result greater than a preset threshold in the multiple second correlation results, and take the piece of second position information, which corresponds to the maximum second correlation result, as the synchronization position.

11. The apparatus according to claim 8, wherein the apparatus is further configured to:
   determine, in frequency division duplex FDD mode, whether the number of cells in a cell synchronization list is greater than or equal to a preset lower threshold, and, if yes, select the part of the sampling points from all the sampling points of the received data.

12. The apparatus according to claim 11, wherein the apparatus is further configured to:
   select all the sampling points of the received data in the FDD mode when it is determined that the number of cells in the cell synchronization list is less than the preset lower threshold;
   carry out the correlation operations on all the sampling points of the received data, and obtain multiple second correlation results and multiple pieces of second position information that correspond to all the sampling points; and
   determine a maximum second correlation result among at least one second correlation result greater than a preset threshold in the multiple second correlation results, and take the piece of second position information, which corresponds to the maximum second correlation result, as the synchronization position.

13. The apparatus according to claim 8, wherein the apparatus is further configured to:
   select, from all the sampling points of the received data and by taking the position of at least one cell in the cell synchronization list as a center, the sampling points within the width of a preset window as the part of the sampling points.

14. The apparatus according to claim 8, wherein:
   the apparatus further comprises a random access memory RAM, configured to receive all the sampling points of the received data, start or stop under control of the work window control unit, and in a start state, cache the received sampling points and output them to the correlation operation unit;
   the apparatus is further configured to:
      start the RAM when the part of sampling points are selected from all the sampling points of the received data and a current sampling point belongs to the part of the sampling points, and stop the RAM when the part of sampling points are selected from all the sampling points of the received data and the current sampling point does not belong to the part of the sampling points;
      start the RAM when all the sampling points of the received data are selected; and
   use a time division multiplexing working manner to carry out the correlation operations on the part of the sampling points output by the RAM.

15. The apparatus according to claim 8, wherein the apparatus is further configured to:
   start the correlation operation and when the part of sampling points are selected from all the sampling points of the received data and a current sampling point belongs to the part of the sampling points,
   stop the correlation operation when the part of sampling points are selected from all the sampling points of the received data and the current sampling point does not belong to the part of the sampling points; and start the correlation operation when all the sampling points of the received data are selected.

\* \* \* \* \*